United States Patent [19]

Nakayama

[11] Patent Number: 5,193,847
[45] Date of Patent: Mar. 16, 1993

[54] AIR BAG
[75] Inventor: Yoshikazu Nakayama, Shiga, Japan
[73] Assignee: Takata Corporation, Tokyo, Japan
[21] Appl. No.: 765,813
[22] Filed: Sep. 26, 1991
[30] Foreign Application Priority Data
  Oct. 22, 1990 [JP] Japan .................... 2-283730
[51] Int. Cl.⁵ ............................................ B60R 21/30
[52] U.S. Cl. .................................... 280/738; 280/743; 280/739
[58] Field of Search ............... 280/730, 731, 732, 738, 280/739, 743

[56] References Cited
U.S. PATENT DOCUMENTS
  3,791,669  2/1974  Hamilton ........................... 280/739
  4,043,572  8/1977  Hattori et al. .
  5,016,913  5/1991  Nakajima et al. ................. 280/743
  5,071,161 12/1991  Mahon et al. ..................... 280/743

FOREIGN PATENT DOCUMENTS
  380699    8/1990  European Pat. Off. .
  2168667   8/1973  France .
  2219033   9/1974  France .
  1297032  11/1972  United Kingdom .
  2237249   5/1991  United Kingdom .
  90/15713 12/1990  World Int. Prop. O. .

Primary Examiner—Kenneth R. Rice
Attorney, Agent, or Firm—Kanesaka and Takeuchi

[57] ABSTRACT

Herein disclosed is an air bag for an air bag system to be mounted on a vehicle for protecting a vehicle passenger. The air bag comprises an air-impermeable cloth disposed at least at the side facing the passenger, and an air-permeable cloth at least at the side of the vehicle body. The air-permeable cloth can be covered from the inside of the air bag with a free member which is made of an air-impermeable or low-permeable cloth.

19 Claims, 2 Drawing Sheets

AIR BAG

BACKGROUND OF THE INVENTION

Field of the Invention

The present invention relates to an air bag of an air bag system mounted on a vehicle for expanding in an emergency such a collision of the vehicle to protect the passenger. More particularly, the present invention relates to an air bag which is equipped with an air-permeable cloth in place of the vent hole at the opposite side of the passenger.

Related Art

The air bag system is one for protecting the passenger of a vehicle by having its air bag abruptly expanded with gases injected from an inflater in response to a collision of the vehicle or the like.

The air bag of this system is made of an air-impermeable cloth at least at the side of the passenger so that the injected gases from the inflater may be blocked. At the opposite side of the passenger, the air bag is either formed with a vent hole or made of an air-permeable cloth to allow passage of the gases.

While the air bag is quickly expanded with the gases injected from the inflater, air will flow into the air bag through the vent hole or the air-permeable cloth which will be totally called the "air breathing portion", to augment the expansion rate of the air bag. When the expanded air bag is hit by the passenger, its gases are released through that air breathing portion to exhibit the shock absorbing effect for absorbing the shocks for the passenger when hitting to the air bag.

If the air breathing portion is formed of the vent hole, the hot fine particles contained in the injected gases from the inflater may flow out the air bag via the vent hole. If, on the contrary, the air breathing portion is formed of the air-permeable cloth, there can be attained an advantage that the air-permeable cloth functions as a filter for filtrating the fine particles.

When the air bag is expanded by the action of the inflater, it is preferable that the air-permeable cloth could allow quick passage of large amount of air to increase the expansion rate of the air bag. If, on the other hand, the air bag having been expanded is hit by the passenger, it is also preferably that the air-permeable cloth could reduce the air flow from the inside to the outside of the air bag to a considerable low rate. In other words, the air bag is enabled to receive the hitting passenger reliably and softly by restricting the outward air flow through the air bag at a predetermined rate.

In the air bag of the prior art having its air breathing portion formed of the air-permeable cloth, however, the outward and inward air flow rates through the air bag are individually so set that they can hardly satisfy the two inconsistent requirements.

OBJECT AND SUMMARY OF THE INVENTION

An object of the present invention is to provide an air bag which can remarkably facilitate the proper matching between the inhale, i.e., the inward air flow rate of the air breathing portion at the expanding time of the air bag and the exhale, i.e., the outward air flow rate at the hitting time of the passenger.

Another object of the present invention is to provide an air bag which can be promptly expanded even if the inflater has a small capacity.

Still another object of the present invention is to provide an air bag which can receive the shocks of the hitting passenger reliably.

The present invention relates to an air bag for an air bag system to be mounted on a vehicle for protecting a vehicle passenger, which comprises an air-impermeable cloth disposed at least at the side facing the passenger; and an air-permeable cloth at least at the side of the vehicle body, wherein the improvement comprises a free member made of an air-impermeable or low-permeable cloth and capable of covering a portion of said air-permeable cloth from the inside of said air bag.

The above cloth forming the free member may preferably be made of either a material which substantially inhibit gases such as air to permeate or a material which has a lower air permeability than that of the air-permeable cloth forming the air breathing portion. The air-permeability of the cloth forming the free member may preferably be one half or less, more preferably one quarter or less, especially one eighth or less relative to the air-permeable cloth forming the vehicle body side of the air bag.

When the air bag of the present invention is to be expanded, air permeates the air-permeable cloth partially from the outside to the inside. Since, at this time, the free member is turned up to leave the permeable cloth, this cloth has its open area enlarged to allow quick passage of sufficient air. As a result, the air bag can be quickly expanded.

When the passenger hits the air bag after the expansion, the free member covers a part of the air breathing portion formed of the permeable cloth from the inside of the air bag. This coverage reduces the open area of the air breathing portion so that the air flow to permeate from the inside to the outside of the air bag is accordingly decreased. As a result, the air flow rate can be freely set to optimize the shock absorbing characteristics when the expanded air bag is hit by the passenger.

DESCRIPTION OF THE PREFERRED EMBODIMENTS

Figure 1:
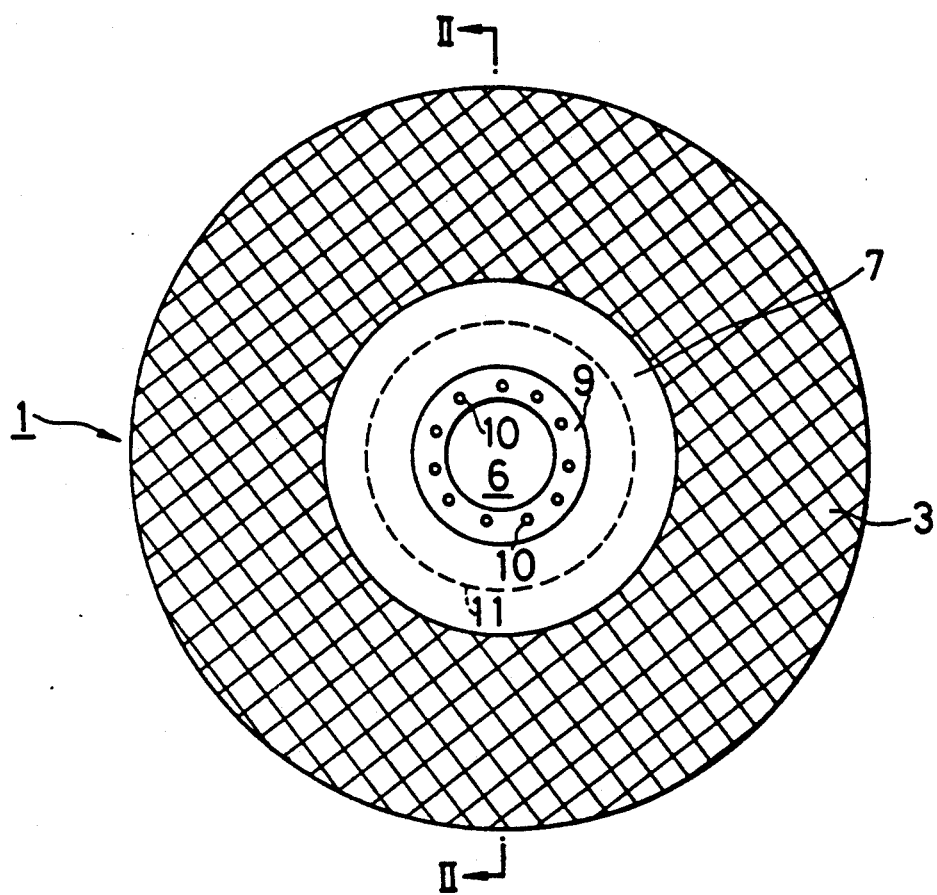
FIG. 1 is a bottom view showing an air bag according to one embodiment of the present invention.
Figure 2:
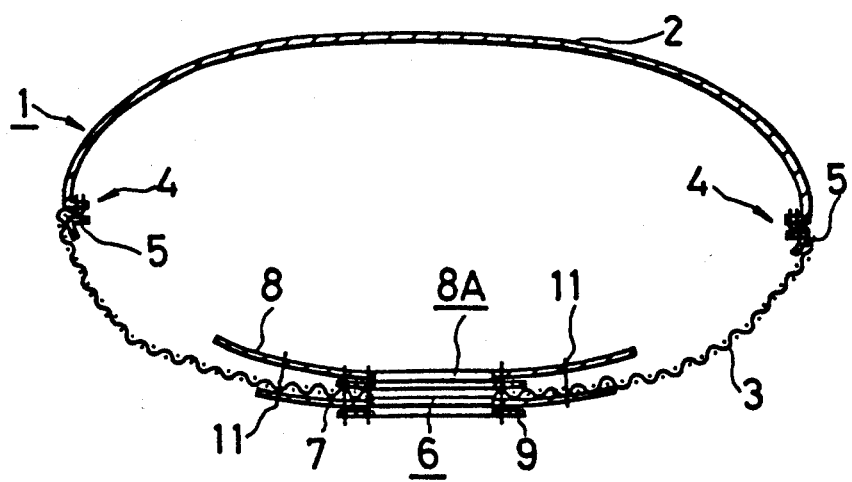
FIG. 2 is a section taken along line II—II of FIG. 1.

FIGS. 1 and 2 show one preferred embodiment of an air bag according to the present invention.

This air bag, as generally designated at reference number 1, is formed of an air-impermeable cloth 2 at the side of a passenger andan air-permeable cloth 3 at the opposite side to the passenger (i.e., at the side of the vehicle body). The cloths 2 and 3 at the passenger side and vehicle body side are sewn at the drum portion of the air bag 1, as indicated at number 4. Designated at number 5 is a tape of silicone resin, which is adhered to the sewn portion.

The cloth 3 at the body side has its central portion opened, as indicated at 6, to receive an inflater or to introduce inflation gases from the inflater. This opening 6 is reinforced by sewing with a ring-shaped patch cloth 7 which is made of an air-impermeable cloth.

Together with this patch cloth 7, there is sewn around the opening 6 the circumferential portion of a disc-shaped free member 8, which is formed with an opening 8A at its center.

Reference number 9 in FIG. 2 designates a reinforcing cloth which is sewn to the cloth 3 over the patch cloth 7 and the free member 8. Number 10 in FIG. 1 designates a bolt hole for fastening the air bag to a holding fixture called the retainer. Number 11 designates a tread sewing up the outer circumferential edge of the patch cloth 7, the permeable cloth 3 and the free member 8 altogether.

Figure 3:
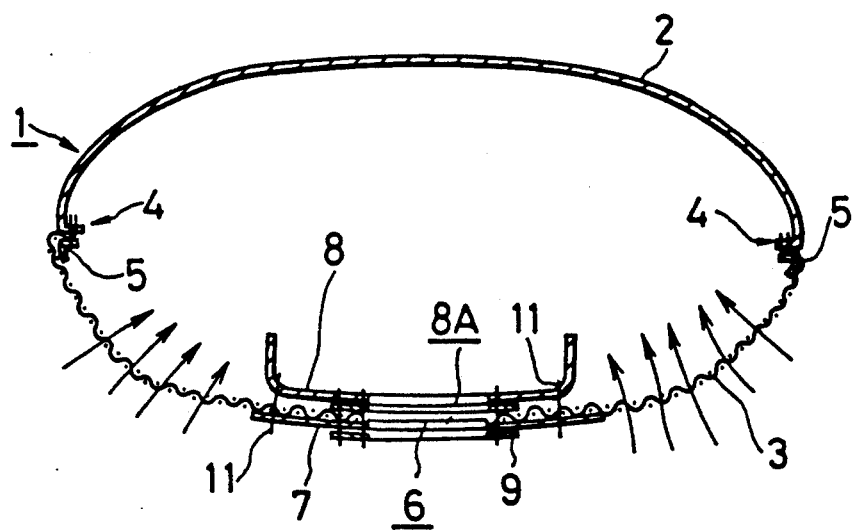
FIG. 3 is a section showing the operating condition of the air bag of FIG. 1.

In the air bag 1 thus constructed, air permeates the permeable cloth from the outside to the inside of the air bag 1 to be expanded. Since, at this time, the free member 8 is turned up to leave the permeable cloth 3, as shown in FIG. 3, the open area of the permeable cloth 3 is enlarged to allow quick passage of sufficient air. As a result, the air bag 1 is quickly expanded.

If the air bag 1 is hit after its expansion by the passenger, the free member 8 covers the air breathing portion formed of the permeable cloth 3 partially (i.e., around the opening 6) from the inside of the air bag 1. As a result, the open area of the air breathing portion is reduced so that the air passage from the inside to the outside of the air bag 1 is accordingly reduced. As a result, this air passage can be freely set to optimize the shock absorbing characteristics of the expanded air bag by the passenger.

More specifically, the air passage from the inside to the outside of the air bag 1 is reduced, if the free member 8 is enlarged, and is increased if the member 8 is small-sized. Thus, the air passage can be controlled to a desired value by selecting the size of the free member 8.

In the present embodiment, the air passage through the permeable cloth 3 can be adjusted by selecting the size of the patch cloth 7.

Although, in the foregoing embodiment, the most of the portion of the air bag at the opposite side of the passenger is formed of the air-permeable cloth 3, the air breathing portion may be provided by forming only a portion at the opposite side of the passenger of an air-permeable cloth.

Here will be exemplified a cloth which is suitably used in the air bag shown in FIGS. 1 and 2:

Impermeable Cloth 2:
  Cloth coated with a silicone resin applied to at least one side; and Permeable Cloth 3:
  Plain weave fabric (of 420 deniers and double yarn) made of Nylon 66 (Trade Name) fibers and coated with a small amount of resin or rubber. This cloth also plays a role as a flameproof cloth. The Nylon 66 is widely known polyamide which is obtained by condensing hexamethylenediamine and adipic acid.

Incidentally, the impermeable cloth 2 may be impregated with the silicone resin. This silicone resin can be replaced by a similarly soft synthetic resin.

I claim:

1. An air bag for an air bag system to be mounted on a vehicle for protecting a passenger and having an inflator, comprising:
   an air-impermeable cloth disposed at least at a side facing the passenger when inflated,
   an air-permeable cloth disposed at least at a side of the vehicle when inflated, said air-permeable cloth being connected to the air-impermeable cloth to constitute the air bag with an inside portion, and
   a free member made of a material to at least restrict air passing therethrough, said free member being connected to the air bag and located adjacent the air-permeable cloth at the inside portion of the air bag so that when the inflator is actuated upon detection of a predetermined acceleration, the air bag is inflated by gas ejected from the inflator and air inhaled through the air permeable cloth while the free member is moved away from the air-permeable cloth, and when the passenger hits the inflated air bag, the free member inside the air bag is disposed on the air-permeable cloth to partly prevent air and gas inside the air bag from escaping from the air bag to thereby control passage of air into and from the air bag.

2. An air bag according to claim 1, wherein said air-permeable cloth includes an opening for receiving the gas ejected from the inflator.

3. An air bag according to claim 2, wherein said air-permeable cloth is arranged around said opening.

4. An air bag according to claim 3, further comprising a ring-shaped patch cloth sewn to said air-permeable cloth from an outside of said air bag and arranged concentrically of said opening.

5. An air bag according to claim 3, wherein said free member is so ring-shaped that it is disposed around and concentrically of said opening.

6. An air bag according to claim 4, wherein said free member is ring-shaped to have a larger diameter than that of said patch cloth and is disposed around and concentrically of said opening.

7. An air bag according to claim 6, wherein an inner circumferential edge of said free member, an inner circumferential edge of said patch cloth, and said air-permeable cloth are so sewn to one another with a thread that an outer circumference of said free member can come into and out of contact with said air-permeable cloth.

8. An air bag according to claim 7, wherein an outer circumferential edge of said patch cloth, said air-permeable cloth and said free member are so sewn to one another with a thread that said free member can come into and out of contact with said air-permeable cloth at an outer circumference of the sewn portions.

9. An air bag according to claim 1, wherein said air-impermeable cloth at the side of the passenger has at least its one side coated with a silicone resin.

10. An air bag according to claim 1, wherein said air-impermeable cloth at the side of the passenger is coated with a soft synthetic resin.

11. An air bag according to claim 1, wherein said air-permeable cloth is a plain weave fabric of polyamide fibers.

12. An air bag according to claim 2, wherein said air-permeable cloth is arranged substantially all over the regions of said air bag at the side of the vehicle.

13. An air bag according to claim 2, wherein said air-permeable cloth is arranged in a major portion of said air bag at the side of the vehicle body.

14. An air bag according to claim 2, wherein said air-permeable cloth is arranged only around said opening of said air bag at the side of the vehicle 15. An air bag according to claim 2, wherein said air-permeable cloth at the side of the vehicle and said air-impermeable cloth at the side of the passenger are sewn with a thread.

16. An air bag according to claim 2, wherein the air permeability of the cloth forming said free member is one half or less than that of said air-permeable cloth at the side of the vehicle.

17. An air bag according to claim 2, wherein the air permeability of the cloth forming said free member is one quarter or less than that of said air-permeable cloth at the side of the vehicle.

18. An air bag according to claim 2, wherein the air permeability of the cloth forming said free member is one eighth or less than that of said air-permeable cloth at the side of the vehicle.

19. An air bag for an air bag system to be mounted on a vehicle for protecting a passenger and having an inflator, comprising:

an air-impermeable cloth disposed at a side facing the passenger when inflated, an air-permeable cloth disposed at a side of the vehicle when inflated, said air-permeable cloth being connected to the air-impermeable cloth to constitute the air bag and having an opening in a center thereof, gas from the inflator being ejected into the air bag through the opening, and a free member made of a material to restrict air passing therethrough, said free member being connected to the air-permeable cloth around the opening thereof and located inside the air bag to be placed over the air-permeable cloth so that when the inflator is actuated upon detection of a predetermined acceleration, the air bag is inflated by gas ejected from the inflater and air inhaled through the air permeable cloth while the free member is moved away from the air-permeable cloth to allow air to pass through the air-permeable cloth, and when the passenger hits the inflated air bag, the free member inside the air bag is disposed on the air-permeable cloth to partly prevent air and gas inside the air bag from escaping from the air bag to thereby control passage of air into and from the air bag.

* * * * *